(12) United States Patent
Didosyan

(10) Patent No.: US 6,618,182 B1
(45) Date of Patent: Sep. 9, 2003

(54) MAGNETO-OPTIC SWITCHING ELEMENT COMPRISING A FARADAY ROTATOR

(76) Inventor: Juri S. Didosyan, Moosbrunnerstrasse 2, A-2521 Trumau (AT)

( * ) Notice: Subject to any disclaimer, the term of this patent is extended or adjusted under 35 U.S.C. 154(b) by 0 days.

(21) Appl. No.: 10/070,987

(22) PCT Filed: Sep. 3, 2000

(86) PCT No.: PCT/AT00/00244
§ 371 (c)(1),
(2), (4) Date: Mar. 14, 2002

(87) PCT Pub. No.: WO01/20390
PCT Pub. Date: Mar. 22, 2001

(30) Foreign Application Priority Data

Sep. 15, 1999 (AT) ................................ 1586/99

(51) Int. Cl.[7] ........................... G02F 1/09; G02F 27/28
(52) U.S. Cl. ..................... 359/280; 359/283; 359/483
(58) Field of Search ............... 359/280, 283, 359/483, 484, 281, 238, 240

(56) References Cited

U.S. PATENT DOCUMENTS

| | | | |
|---|---|---|---|
| 3,526,883 A | 9/1970 | Tabor | 365/1 |
| 4,495,492 A | 1/1985 | Anderson et al. | 340/783 |
| 5,345,329 A * | 9/1994 | Shirai et al. | 359/282 |
| 5,588,013 A * | 12/1996 | Reitz et al. | 372/19 |

OTHER PUBLICATIONS

M.V. Chetkin et al., "Measurement of the Velocity of Motion . . . " in Instruments and Experimental Techniques, Consultants Bureau, Bd 23, No. 1, Jan. 1980, pp. 215–218.
S. Gadetsky et al., "Magneto–Optical Recording on Patterned Substrates (Invited)" in J. Appl. Phy., Bd. 79, No. 8, Apr. 15, 1996, pp. 5687–5692.
Y.S. Didosyan et al., "Magneto–Optical Current Sensors of High Bandwidth" in Second European Magneto Sensors and Actuators Conference, Sheffield UK, Jul. 13–15, 1998, Bd. A81, No. 1–3, pp. 263–267.

* cited by examiner

Primary Examiner—Jordan M. Schwartz
Assistant Examiner—Tim Thompson
(74) Attorney, Agent, or Firm—Dykema Gossett PLLC

(57) ABSTRACT

In a magneto-optical switching element with a Faraday rotator, in order to increase the switching speed and to reduce the required switching energy respectively, the rotator consists of a magnetically uniaxial crystal, which features magnetic domains of both signs in each of its stable states, by means of which problems are avoided with the creation of domains of opposite signs at the beginning of the switching process.

9 Claims, 4 Drawing Sheets

MAGNETO-OPTIC SWITCHING ELEMENT COMPRISING A FARADAY ROTATOR

BACKGROUND OF THE INVENTION

The invention relates to a magneto-optical switching element with a Faraday rotator formed from a magnetically uniaxial crystal, and can be used, for example, in optical switching systems, in optical telecommunications, and in data processing, for altering the optical path of a light beam, in optical shutters, optical attenuators, or in spatial light modulation systems, which are capable of altering the intensity of given parts of light beams.

Mechanical optical switches, shutters, and the like have the advantage that stable switching states without permanent energy consumption can be attained with relatively simple means. The disadvantage of such mechanical switching elements is their relatively low switching speed, which by nature excludes their use in many fields referred to in the preamble.

High switching speeds are provided, for example, by known electro-optical switching elements (see, for example, U.S. Pat. No. 5,712,935) or acoustic-optical switching elements (see, for example, U.S. Pat. No. 5,883,734), but they require a permanent supply of energy in order for stable switching states to be maintained. Exceptions to this are, for example, switching elements on the basis of the electro-optical effect with amorphous materials, which likewise feature stable states without permanent energy supply (see, for example, EP 0 500 402), whereby, however, their switching time is relatively high, since the transition times between the stable states lie in the ms-range.

The known magneto-optical switching elements referred to in the preamble offer a compromise solution. In comparison with mechanical elements they do not have any moving parts, and therefore have correspondingly low sensitivity to vibrations or shocks, and higher switching speeds, although associated with a wavelength-dependent operation. Compared with high-speed electro-optical and acoustic-optical switching elements they possess stationary states without external energy supply, although associated with somewhat higher switching times.

In this latter connection, reference may be made, for example, to the following works and publications: M. Shirasaki, H. Nakajima, T. Obokata, and K. Asama: Non-mechanical Optical Switch for Single-Mode Fibers, Appl. Opt. 21, 4229 (1982); M. Shirasaki, H. Takamatsu, and T. Obokata: Bistable Magnetooptic Switch for multimode Optic Fiber, Appl. Opt. 21, 1943 (1982); M. Shirasaki et al: Magnetooptical 2×2 switch for single-mode fibers, Appl. Opt. 23, 3271 (1984); M. Shirasaki: Faraday Rotator Assembly, U.S. Pat. No. 4,609,257 (1986); S. Takeda, Faraday rotator device and optical switch containing same, EP Patent 0 381 117 (1991); M. Shirasaki: Faraday rotator which generates a uniform magnetic field in a magnetic optical element, U.S. Pat. No. 5,812,304 (1998).

These feature bistable magneto-optical Faraday rotators, which do not require any permanent energy supply, but require energy solely for the process of switching between the stable states. The bistability is based in this case on the magnetic hysteresis, i.e. on the ability of certain magnetic materials to remain in a magnetised state after magnetising up to saturation. The magneto-optical (MO) materials used in this study represented compositions of iron garnets. These materials do not possess square-shaped hysteresis loops and accordingly remain demagnetised in the absence of an external field.

In order to create the bistability, the MO material is placed into the field of an electro-magnet with a core from semi-hard magnetic material (M. Shirasaki et al.: Magnetooptical 2×2 switch for single-mode fibers, Appl. Opt. 23, 3271 (1984). The core is magnetised by the electrical current pulse flowing through the windings with a specific polarity, until saturation. After the end of the pulse, both the core as well as the MO material remain magnetised and a rotation of the polarisation plane of the light passing through the MO material takes place. A change in the current polarity has the effect of a change in the direction of rotation of the polarisation plane. Both states are stable and the system accordingly remains without further energy consumption.

In order to prevent domain wall displacements in the rotator during the reversal of the magnetic field, which cause an irregular change of polarisation of the emergent light, an additional magnetic field was introduced (M. Shirasaki: Faraday Rotator Assembly, U.S. Pat. No. 4,609,257 (1986) and M. Shirasaki: Faraday rotator which generates a uniform magnetic field in a magnetic optical element, U.S. Pat. No. 5,812,304 (1998). This field is generated by a magnet and holds the rotator in the monodomain state. The magnetic field of the electromagnet accordingly only exerts magnetisation rotation and does not influence the domain structure.

One disadvantage in this context is the slow switch-over of the direction of magnetisation and in particular the switching of the direction of rotation of the polarisation. According to EP 0 381 117 (1991), "Faraday rotator device and optical switch containing the same", in Example 2 the switching time was some 500 ms. In the article by M. Shirasaki et al.: "Non-mechanical Optical Switch for Single-Mode Fibers, Appl. Opt. 21, 4229 (1982)", the switching time was about 10 $\mu$s. This relatively long switching time is associated with the high inductivity of the coil of the electromagnet; this amounts to some 7 mH. If permanent magnets and other configurations are used, for example in accordance with U.S. Pat. No. 5,812,304, the field of the electromagnet must have very much higher values, since for the magnetisation rotation the saturation field generated by the permanent magnets must be attained. This necessarily leads to much higher switching times than the 10 $\mu$s. referred to above. A further disadvantage of this known switching element is its size, which is determined by the dimensions of the core of the electromagnet; moreover, no multistable operation of the rotator is possible.

SUMMARY OF THE INVENTION

The aim of the present invention is to avoid the disadvantages mentioned of the described known magneto-optical switching elements of the type referred to in the preamble, and in particular to reduce the switching times, the switching energy required, and the overall dimensions of the switching element, as well as also making possible, in an advantageous manner, a multistable operation with several switching states.

This aim is achieved according to the present invention with a magneto-optical switching element of the type referred to in the preamble, in that the rotator, in each of its stable states without an external magnetic field imposed, features magnetic domains of both orientations, the walls of which are capable of being moved for switching over into another stable state by the imposition of an external magnetic field without the creation of additional domains. The switching element thus derived can in a simple manner possess different stable states, in which it can remain without time limitation and without energy consumption. The transition between these stable switching states takes place in the nano-second range, whereby only low optical losses occur in the infrared range, very little switchover energy is required, and, overall, very small dimensions can be maintained.

Magneto-optical materials are known with square-shaped hysteresis loops; that it to say, these materials remain magnetised in the absence of an external magnetic field. Orthoferrites are, for example, representatives of this material group. Orthoferrites are weak ferromagnets, which are characterised by a low resultant magnetisation and a very high uniaxial magnetic anisotropy. Orthoferrites are optically biaxial crystals. Large angles of the Faraday rotation can only be achieved in the absence of crystallographic birefringence, i.e. when the light. is propagated along the optical axes of the crystal. In this case, high magnetooptical figure of merit (FM), i.e. the ratio of the Faraday rotation to the absorption, takes place. In the visible range and in the near infrared range (including the wavelength of 1.55 $\mu$m, important for optical telecommunications), orthoferrites have the best FM values of all magneto-optical crystals. An important advantage of orthoferrites compared with other magnetic materials is the extremely high domain wall velocity of 20 km/s.

The high coercivity of orthoferrites is an important advantage in the optical isolation mode. In dynamic applications in the development of optical switches, shutters, spatial light modulators, optical attenuators, etc., the high coercivity is a disadvantage, however, because it requires very high field strengths. The high coercivities are caused by the necessity of domains magnetised in the opposite direction. When magnetised until saturation the stable states of the rotator are attained, whereby only one single domain is present, and no domains with opposed orientation. In order to rotate to the oppositely magnetized domains, high magnetic fields are required, and, in addition to this, only two stable states exist (according to the two directions of saturation magnetisation), which do not change after the switching off of the external magnetic field.

The mode of operation of the rotator is improved according to the invention, insofar as domains of both orientations (i.e. at least two domains with differing orientation) are already present in the stable states of the rotator which are unchanging after the disconnection of the external magnetic field. The existence of both domain directions resolves the problems of their creation and leads to smaller external magnetic fields being required, and to a reduction in the switching times. In order to achieve this, according to an advantageous embodiment of this invention, inhomogeneities and lattice deviations are made in the rotator.

Such inhomogeneities have already been used in other connections for the development of magneto-optical memories. In the studies by Te-Ho Wu et al., Magnetic domain pinning in patterned magneto-optical material, J. Appl. Phys. 85, 5980–5982 (1999); S. Gadetsky, J. K. Erwin, M. Mansuripur and T. Suzuki, Magneto-optical recording on patterned substrates, J. Appl. Phys. 79, 5687 (1996), the substrates, on which a thin film of magneto-optical material had been applied were structured. The edges of the resultant structure were used as a delimitation for the domains. According to RU 2 029 978 C1, inhomogeneities in the form of indentations with flat bases in the magneto-optical film material are used to retain the individual domain areas. In both cases, individual domains were prepared in specific areas, in that the thickness of a carrier material, on which the magneto-optical film is applied, or the thickness of the magneto-optical film itself, are varied. Such a procedure is not possible with bulk crystals since it is practically impossible for indentations with dimensions of fractions of millimetres and with flat bases to be created in optical quality on a crystal. In addition to this, in all the cases cited for switching over the domain orientation, the first thing which is required is again the creation of domains with opposite orientation, so that the disadvantages described earlier of the relatively strong magnetic fields required will again pertain in this case.

In DE 28 39 216 A1, a magneto-optical modulator is described with which no creation of domains of opposite orientation are required in order to initiate the switch-over. A magnetically uniaxial magneto-optical film is divided into island-like areas, which are magnetically separated from one another. Each island contains several domains with different orientations. As a consequence of the absence of magnetic interaction between the islands, each of them can be easily magnetised by magnetic fields from small coils, which act directly on the given islands. Since in the absence of external magnetic fields the individual islands are demagnetised, the magnetisation process pertains in the movement of the domain walls. With the arrangement given, this means, however, an absence of stable states in the literal sense, in which the rotator remains without an external magnetic field; if the external field is switched off, the widths of the oppositely magnetised domains become equal to one another, whereby the total Faraday rotation of these islands becomes zero.

According to the present invention, by contrast, the main task of the inhomogeneities referred to is to be seen as that of fixing the domain walls of the existing domains in the predetermined position, whereby, when switching over, only existing domain walls need to be moved, and there is no need for an additional initial creation of domains with opposite signs. The inhomogeneities according to the present invention are therefore only required at the lines at which domain walls are intended to remain after the disconnection of the external magnetic field (corresponding to the stable states of the rotator) and not in the entire range covered by the existing domains, as has been described earlier as the prior art.

The inhomogeneities consist, for example, of narrow scratches on the surface of the crystal. The scratches represent new local minima of the magnetic energy and keep the domain walls. As a result, the domain structure is retained in the given state when the external magnetic field is switched off. As a function of the depth of the scratches, the coercivity of the given domain structure is regulated, i.e. the magnetic field required for removing the domains from the scratches. If different sets of scratches, or general lattice deviations, are introduced to the specimen, different fixing points of the domain wall are created, and therefore different stable states of the rotator or switching element respectively.

BRIEF DESCRIPTION OF THE DRAWINGS

Further features and advantages of the invention are explained hereinafter, especially on the basis of the partially diagrammatic drawings.

DETAILED DESCRIPTION OF THE PREFERRED EMBODIMENT

Figure 1:
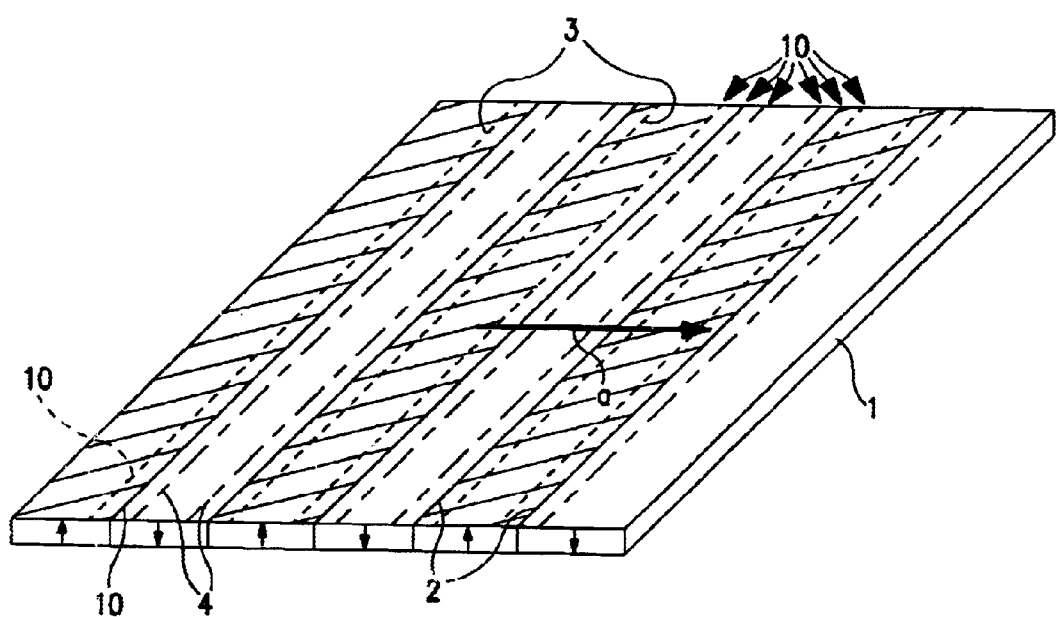
FIG. 1 shows a multi-stable switching element according to the present invention, FIG. 2 a multi-stable rotator with permanent magnets for use in a switching element according to the present invention, FIG. 3 a multi-stable switching element according to the present invention as an optical switch, and FIG. 4 a corresponding switching element according to the invention for use as an optical shutter.

FIG. 1 shows, as a diagrammatic example of an embodiment of the invention, a rotator with an orthoferrite crystal platelet 1 with three sets 2, 3, 4 of surface scratches 10, as a lattice deviation. The crystal platelet 1 is cut perpendicular to the optical axis; the arrow a shows the direction of the crystallographic a-axis. One of the sets 2 correlates with the equilibrium state of the domains. The distances between the scratches 10 are equally large and correspond to the equilibrium widths of the domains in the platelet. Another set 3 corresponds to the state of the partial (positive) magnetisation of the platelet. This set accordingly consists of scratches 10 at different intervals on alternating sides to the scratches 10 of the set 2. To change the domain structure, a pulsed external magnetic field is imposed. During the pulses, the domains oriented in the direction of the imposed magnetic field are enlarged at the expense of those oriented in the opposite direction. If the amplitude and duration of the pulse are sufficiently large, the domain walls reach the scratches 10 of the set 3, which fix the domain walls, after the end of the pulse, they remain in these positions, and the rotator is in a stable state. In order to return to the original state, a magnetic pulse of the opposite direction must be imposed. By analogy with set 3, an opposed set 4 can be created. Accordingly, a further stable state is imposed. In this manner, different sets of scratches 10 can be applied at different distances from the set 2, and therefore a large number of stable states of the switch can be defined.

The amplitude and temporal duration of the magnetic field pulse is selected as a function of the distances between the scratches 10. If the amplitude is too small or the time duration too short, the domain walls cannot reach the next scratches set, and, after the end of the pulse, they move back into their initial position. If the amplitude is too large, or the time duration too long, the domain walls move further than necessary, and, after the end of the pulse, move back to the scratches.

Figure 2:
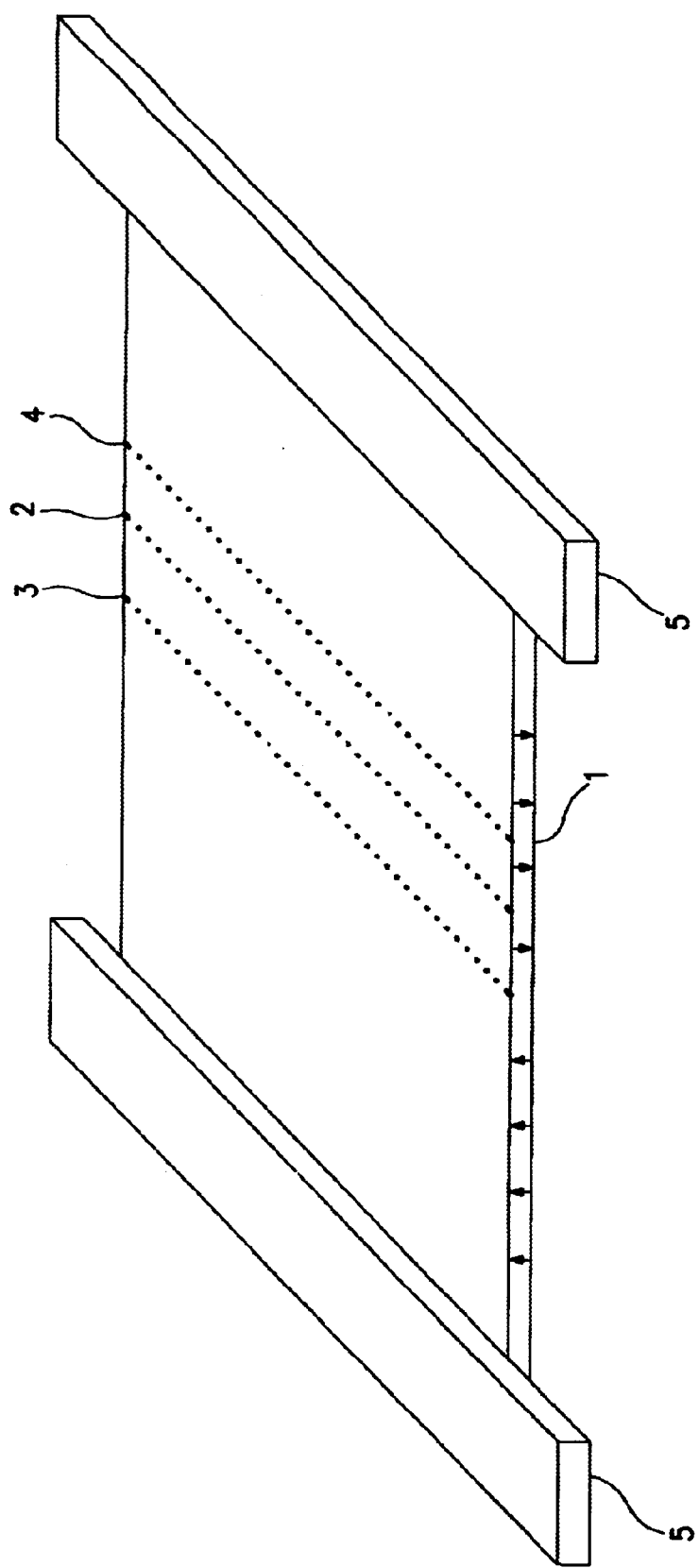

In another embodiment of the invention according to FIG. 2, the scratches used for the fixing of the domains are combined with an inhomogeneous magnetic field. This field is created by permanent magnets (5) and is used for fixing the domain structure. In this way, the embodiments and the dynamic properties of the rotator are extended. The speed of the domain wall motion increases with an increase in. the magnetic field (in a broad range of velocities, proportionality between these quantities takes place). The shorter the switching tirmes are intended to be, the higher the magnetic field pulse must be. Excessively high magnetic fields can, however, produce irreversible domain displacements, such as, for example, the creation of new domains. The imposition of a gradient-shaped magnetic field stabilizes the domain walls and limits their movability. The gradient field is created by two pairs of small permanent magnets. The magnetic, field generated by each pair has opposite polarity, and the rotator is divided into two domains. In the absence of other magnetic fields, the domain wall is located at the place at which the gradient field passes through zero (zero field line): a stable state of the switch (corresponding to Set 2 in FIG. 1). The scratches are applied on both sides of this line. They represent straight lines parallel to the zero field line. Under the action of a magnetic field pulse, the domain wall reaches a specific scratch. If the pinninig is strong enough, the domain wall remains held at this scratch after the end of the pulse. This results in stable states, corresponding to the sets of scratches.

In a broad range of the external magnetic fields the absolute value of the rotation of the polarization plane in the domains is independent of the strength of magnetic field, and accordingly the function of the rotator is not affected by the inhomogeneity of external magnetic fields.

The changes in the domain structure between the stable states are of a regular nature. They consist of the displacement of the domain walls and do not cause any undesired light fluctuations.

The shortest switching times of the rotator are mainly limited by the minimum duration of the single magnetic field pulses; they lie in the ns-range.

Figure 3:
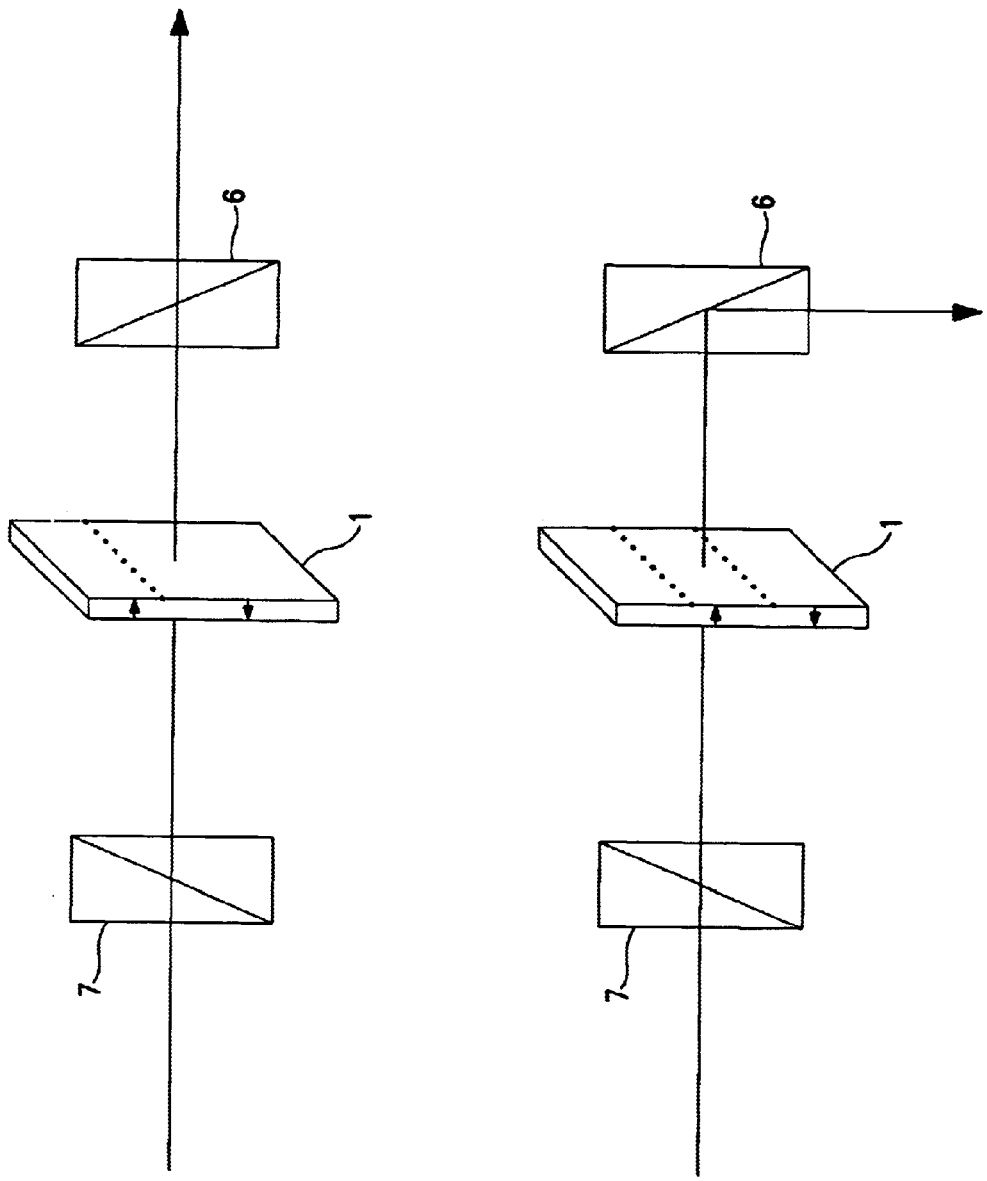

FIG. 3 shows the diagram of a switch based on a multistable optical rotator. The thickness of the orthoferrite platelet 1 is selected in such a way that the polarisation plane of the light initially transmitted by a polarizer 7 is rotated through 45°. The sign of the rotation depends on the domain through which the light passes. If the light passes through domains with the magnetisation anti-parallel to the propagation direction of the light, then a rotation takes place in the clockwise direction. After passing through a polarisation separating element (6), the light propagates in the horizontal direction. If the light passes through the oppositely magnetised domain, the polarisation plane rotates through −45° and, after passing through a polarisation separating element (6), the light is propagated in a vertical direction.

Figure 4:
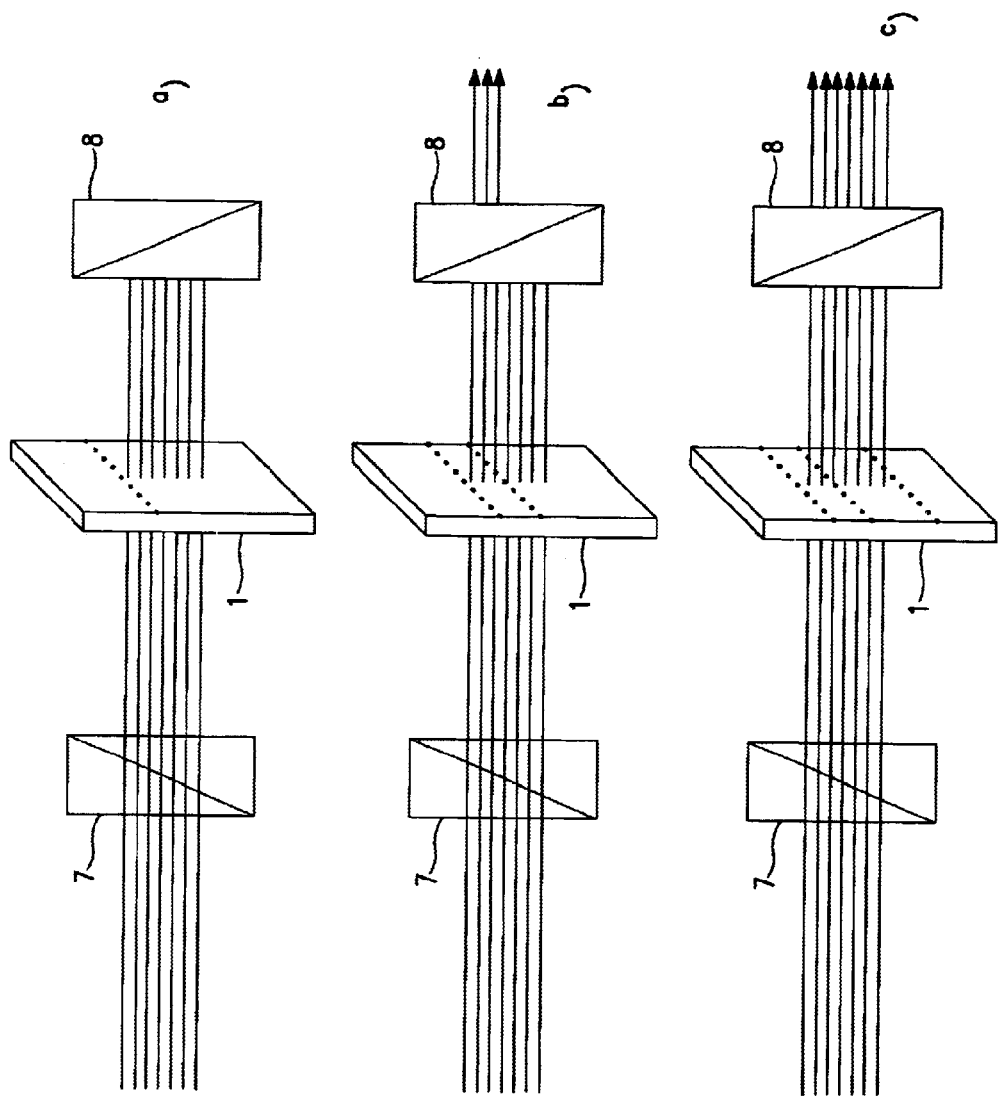

FIG. 4 shows a diagram of an optical shutter, based on the multistable rotator. In the case a), the polarised light beam is extinguished by the analyser (8). In the case b), a part of the light beam passes through the analyzer 8, namely precisely the part which is passed through the domain magnetised parallel to the propagation direction of the light. In case c), the whole light beam is allowed to pass through the analyzer 8.

As already indicated in the preamble, instead of the surface scratches in the crystal of the rotator for stabilizing the domains, other lattice deviations can also be provided for, such as cavities provided in the interior of the crystal, foreign inclusions, or the like, or even, in specific areas, changes in doping concentration. Instead of such lattice deviations extending in linear fashion over the crystal, it is also possible to operate with other forms or arrangements of such lattice deviations; also possible are delimited areas, broken lines, etc., whereby it needs only to be ensured that these areas are suitable for fixing the domain walls after the disconnection of an external magnetic field. As long as magnetic domains of both signs remain in the rotation crystal, in the stable state of the magneto-optic switching element which is thus derived, then the advantages of the invention otherwise mentioned will also be retained in full.

What is claimed is:

1. A magneto-optical switching element with a Faraday rotator from a magnetically uniaxial crystal, characterised in that the rotator features magnetic domains of both orientations in each of its stable states without the imposition of an external magnetic field, the walls of said domains being capable of movement for switching into another stable state by the imposition of an external magnetic field without the creation of additional domains.

2. The switching element according to claim 1, characterised in that, for the stabilization of domains in the absence of an external magnetic force, lattice deviations of the crystal are provided for, in order to fix the domain walls thereto.

3. The switching element according to claim 2, characterised in that the lattice deviations are formed from surface scratches, grooves, slots, or the like on the crystal.

4. The switching element according to claim 2, characterised in that the lattice deviations are formed from cavities, drillholes, foreign inclusions and the like in the interior of the crystal.

5. The switching element according to claim 2, characterised in that the lattice deviations are formed by doping the crystal area by area or by doping changes of the crystal.

6. The switching element according to claim 2, characterised in that on both sides of the domain walls several lattice deviations are provided at given intervals, corresponding to several stable states of the crystal.

7. The switching element according to claim 2, characterised in that the crystal is cut essentially perpendicular to the optical axis, and is orthoferrite arranged essentially parallel with this to the direction of the penetrating light beam.

8. The switching element according to claim 7, characterised in that the lattice deviations extend essentially linear and at least approximately perpendicular to the crystallographic a-axis of the crystal.

9. The switching element according to claim 1, characterised in that a magnetic gradient field which passes through zero in the area of the crystal is permanently imposed on the crystal, for preference by means of at least a pair of permanent magnets.

* * * * *